F. WINKLER.
RETAINER FOR BALL BEARINGS.
APPLICATION FILED MAR. 5, 1915.

1,176,804.

Patented Mar. 28, 1916.

Witnesses
A. Pauline Davis
W. Wallace Nairn Jr.

Inventor
Franz Winkler
By Dowell & Dowell
his attorneys.

UNITED STATES PATENT OFFICE.

FRANZ WINKLER, OF SCHWEINFURT, GERMANY.

RETAINER FOR BALL-BEARINGS.

1,176,804. Specification of Letters Patent. Patented Mar. 28, 1916.

Application filed March 5, 1915. Serial No. 12,342.

*To all whom it may concern:*

Be it known that I, FRANZ WINKLER, a subject of the King of Bavaria, residing at Schweinfurt, in Bavaria, Germany, have invented certain new and useful Improvements in Retainers for Ball-Bearings, of which the following is a specification.

The invention has reference to a retainer-ring for spacing apart and guiding the balls of a ball-bearing in line; this construction of a ball-retainer may be used in ball-bearings having spherical, conical, cylindrical or grooved race-ways, and in either of them with the advantageous effect of securing the balls of the series in the same plane, while dropping out of the balls is effectively prevented, when the retainer is removed from the bearing.

The essential features of the structure by which said objects are attained are disclosed hereinafter. The body of the retainer consists of a single ring member having a substantially cylindrical middle part and lateral flanges which extend from the two ends of the former, thus providing a circumferentially deeply grooved ring of substantially U-shaped cross-section. While the middle part of the ring body is perforated to permit the balls received between the flanges partly to project through said middle part, the flanges are undulating or sinuous with their lateral faces and form pockets at either side of every perforation, a contraction being created in the interstice between two perforations. The bulges of the flanges are further hollowed out in spherical shape and constitute the single pockets for the balls together with the corresponding perforations. The means securing the balls apart are the integral parts of the middle ring and the corresponding contracted walls of the flanges. While the middle part of this retainer-ring may be rather rigid to present the required resistance, the flanges are preferably resilient, thus allowing the insertion of the balls into the pockets and producing a yielding spacing thereof.

In the accompanying drawing which forms a part of this specification, an embodiment of the said invention is represented by way of example.

Figure 1:
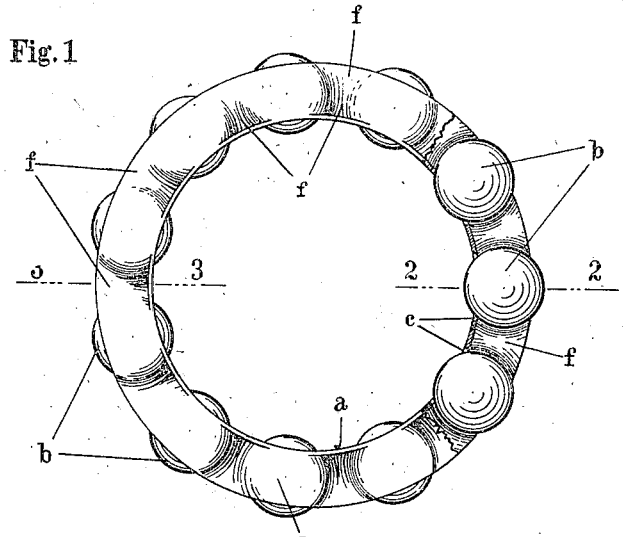
Figure 2:
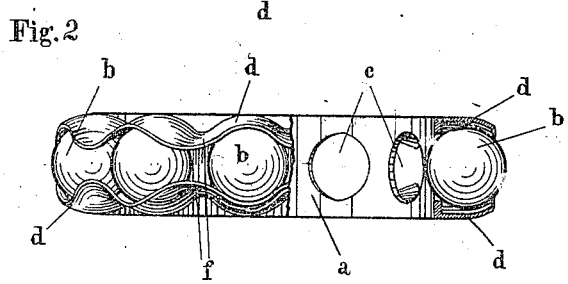
Figure 3:
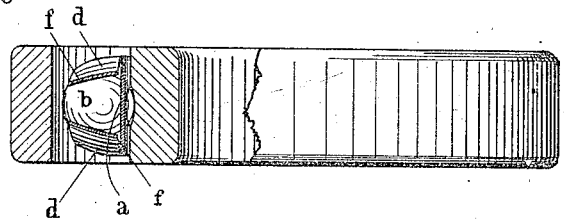

In this drawing Figure 1 is a side-elevation of the retainer-ring filled with balls and partly a section on the middle-plane of the construction. Fig. 2 represents a peripheral view and partly a cross-section on the line 2 to 2 of Fig. 1. Fig. 3 illustrates an annular ball-bearing with the retainer-ring inserted, shown in cross-section on the line 3 to 3 of Fig. 1.

Like reference letters denote like parts throughout all figures of the drawing.

The retainer-ring comprises a middle cylindrical body $a$ provided with a number of perforations $c$ of any convenient shape at the required distances, and flanges $d$ projecting outwardly from the edges of the part $a$. The flanges $d$ are bent toward each other at the places $f$ between the said perforations $c$, so that they present undulating sides. Those parts of the flanges of larger distance which are opposite to the perforations $c$, are the ball-receiving pockets of the retainer, the perforations allowing the balls $b$ to project on the inner side thereof to a certain extent. Owing to the disclosed arrangement of the retainer the balls are secured in given distances in circumferential relation by the middle part $a$ and also by the contracted bends $f$ of the flanges $d$, which bends are a resilient means insuring the smooth and silent running of the balls. Of course, the bends $f$ can be of any required size or depth; they should be large enough to space the balls, but the confronting bends must not touch each other. They are preferably curved, so that the pockets affect the circumference of the balls, they may however be of any other suitable shape.

The pockets wherein the balls are guided with a certain limited, but small free play, are conveniently rounded out, so that they more perfectly approximate the periphery of the balls. For the same object the edges of the flanges $d$ can be bent inwardly or toward each other on their entire circumference, which will be best seen from Figs. 2 and 3. This narrowing of the outer opening of the pockets has the effect that the balls are surely guided and their falling out is avoided; on the other hand, the retainer-ring is supported by the balls in the bearing in concentric position. Further, the entire construction of the retainer-ring is stiffened, although some resiliency is kept up, which allows the insertion of the balls between the contracted edges of the flanges, by which the balls are gripped thereafter.

In the example illustrated in the drawing the bends $f$ are partly cut off from the ends of the cylindrical part $a$, when they are pressed inwardly with the employment of a suitable tool. Then the flanges *d* are connected with the middle part *a* laterally of the perforations *c* only and therefore get a higher resiliency. Besides this very deep bends *f* can be made with the effect that the balls are more considerably encircled.

As will be seen from Fig. 1, the balls partly project over the outer and inner edges of the flanges, in order to contact with the race-ways of the rings. According as the construction is used in bearings with cylindrical or grooved races, the degree of projection of said balls can be different.

The retainer-ring can be made by milling it out from an integral thick ring or pressing it from a sleeve or sheet metal blank and the thickness of its walls may be varied at the different places according to the requirements of its employment.

In another embodiment of the invention the cylindric part *a* can be located outward, the flanges *d* being thereby directed to the center. This arrangement will be easily conceived of, as it simply results with the inversion of the parts; for this reason it needs not to be illustrated.

What I broadly claim as my invention, and desire to secure by Letters Patent, is—

1. A ball-retainer for ball-bearings, comprising a substantially cylindrical middle part having a number of perforations and flanges projecting from the edges of said part, undulating bends being formed on said flanges, which bends are partly cut away from said body between said perforations and extend toward each other.

2. A ball retainer and separator for ball bearings consisting of a ring-shaped portion having spaced openings therein and integral radially extending flanges inclined toward each other and having their edges inturned at intervals so as to present opposed convex portions alternating with opposed concave portions, said convex portions being partially cut away from the ring-shaped portion and the bases thereof pressed inwardly, whereby pockets are formed for retaining balls protruding through said openings above and below said flanges.

3. A ball retainer and separator for ball bearings consisting of a ring-shaped portion having spaced openings therein to receive the balls and having integral radially extending undulating flanges embracing the balls, said flanges having their edges inturned at intervals so as to provide alternating confronting concave and convex portions, said convex portions being partially cut away from the ring-shaped portion and the bases thereof pressed inwardly, thereby forming pockets for retaining balls protruding through said openings above and below said flanges.

4. A ball-retainer for ball-bearings, comprising a substantially cylindrical body having a number of ball-receiving perforations and flanges projecting radially from the edges of said body, undulating bends being formed in said flanges, which bends extend from the base to the outer edges of said flanges and converge toward each other throughout their entire width, thereby forming ball-pockets adjacent said perforations.

5. A ball-retainer for ball-bearings, comprising a ring-shaped member having a number of ball-receiving perforations and flanges projecting from the edges of said member, the flanges being undulated so as to form ball-receiving pockets adjacent said perforations, the edges and bases of the flanges being bent inwardly between the balls to retain them in the pockets.

In testimony whereof I have signed my name to this specification in the presence of two subscribing witnesses.

FRANZ WINKLER.

Witnesses:
 OSCAR BOCK,
 RALPH DOX.